United States Patent [19]
Belka

[11] Patent Number: 5,090,717
[45] Date of Patent: Feb. 25, 1992

[54] LONGITUDINALLY ADJUSTABLE BICYCLE BAGGAGE CARRIER

[75] Inventor: Heinrich Belka, Bielefeld, Fed. Rep. of Germany

[73] Assignee: ESGE-Marby GmbH & Co. KG, Bielefeld, Fed. Rep. of Germany

[21] Appl. No.: 581,400

[22] Filed: Sep. 12, 1990

Related U.S. Application Data

[63] Continuation of Ser. No. 350,540, May 11, 1989, abandoned.

[30] Foreign Application Priority Data

May 21, 1988 [DE] Fed. Rep. of Germany ....... 3817396

[51] Int. Cl.⁵ ............................................. B62J 9/00
[52] U.S. Cl. ............................ 280/304.5; 224/32 A
[58] Field of Search .................. 280/202, 288.4, 293, 280/295, 304.3, 304.5; 224/32 X, 39; 248/287, 298; 403/220, 362

[56] References Cited

U.S. PATENT DOCUMENTS

| | | | |
|---|---|---|---|
| 3,346,156 | 10/1967 | Jones | 224/32 |
| 4,174,795 | 11/1979 | Jackson et al. | 224/39 X |
| 4,350,361 | 9/1982 | Fujii | 280/289 A |
| 4,383,625 | 5/1983 | Kiang | 224/39 |
| 4,429,818 | 2/1984 | Patterson | 224/39 |
| 4,537,338 | 8/1985 | Belka | 224/39 |
| 4,545,602 | 10/1985 | Shibahata | 280/91 |
| 4,666,071 | 5/1987 | Irwin | 224/39 |
| 4,709,935 | 12/1987 | Takizawa et al. | 280/91 |
| 4,781,262 | 11/1988 | Nakamura et al. | 280/91 |

FOREIGN PATENT DOCUMENTS

| | | |
|---|---|---|
| 3231461 | 4/1983 | Fed. Rep. of Germany . |
| 1085034 | 1/1955 | France . |
| 3343844 | 10/1984 | France . |
| 316315 | 11/1956 | Switzerland . |
| 2066751 | 7/1981 | United Kingdom . |

Primary Examiner—Charles A. Marmor
Assistant Examiner—Mitchell Bompey
Attorney, Agent, or Firm—Frishauf, Holtz, Goodman & Woodward

[57] ABSTRACT

To permit horizontal alignment of a baggage or luggage carrier frame (11) in which the luggage carrier is supported by at least two support legs (16, 17) extending from side elements (12, 13) of the frame and converging to a holder (18) attached to the bicycle frame adjacent an axle receiving portion (6) thereof, the legs are coupled to the longitudinal elements (12, 13) of the frame by releasable attachment elements (37, 52, 56, 61), which permit sliding of the support legs along the longitudinal side elements so that the support legs can be located along the side legs at arbitrarily selected positions and thus permit horizontal alignment of the baggage carrier with bicycles having attachment points for the baggage carriers at various selected locations and/or being designed, respectively, for wheels of various diameters. The longitudinal alignment, preferably, is effected by having a slider element, such as a headed screw, a slider block or the like clamped in a groove extending parallel to the frame and formed on the frame or cross elements forming part thereof.

20 Claims, 5 Drawing Sheets

LONGITUDINALLY ADJUSTABLE BICYCLE BAGGAGE CARRIER

This application is a continuation of application Ser. No. 07/350,540, filed May 11, 1989 now abandoned.

The present invention relates generally to baggage carrier for bicycles and, more particularly, to a carrier in which the attachment point of its support legs can be adjusted along the horizontal support surface of the carrier to adapt the carrier to different sizes of bicycles.

BACKGROUND

U.S. Pat. No. 4,551,338, Belka to which German Patent 33 43 844 corresponds disclose a bicycle baggage carrier having on each side of the bicycle wheel a pair of support legs which converge downwardly to a V-shape. The upper ends of the support legs rest in plastic bearing parts which are installed at the factory. Although the support legs can be swivelled within the plastic bearing parts, the parts cannot be slid along the frame of the baggage carrier. In these conventional baggage carriers, adjustability is limited to height adjustment of the support legs in a clamping element which is to be fastened to the axle-receiving end of the rear fork tube. In this manner, only height differences between an attachment plate and the rear wheel axle can be compensated for.

However, whenever the spacing between the axle-receiving end of the bicycle afterstructure and the attachment plate, e.g. a Pletscher plate, in relation to the bicycle's longitudinal axis, does not correspond to the spacing for which the bicycle baggage carrier was dimensioned and constructed, the back support surface defined by the frame of the baggage carrier will be tilted from the horizontal, or the inclination of the support legs will change. Such a tilting of the pack support surface is undesirable, because it tends to make any luggage slide off.

THE INVENTION

It is an object of the present invention to provide a baggage carrier, for a two-wheeled vehicle, e.g. a bicycle which is light-weight and can be readily matched to various geometries or arrangements of bicycle frames.

Briefly, means are provided for releasably securing the ends of support legs at any of a variety of positions along the longitudinal side elements which form part of the frame defining the baggage or pack support surface.

As a result of the longitudinal adjustability of the support legs on the longitudinal side of the baggage carrier frame, changes in the spacing between the attachment plate or an analogous element, on the one hand, and the position of the axle-receiving ends, on the other hand, do not matter, since the support legs can be adjustably attached along the frame of the baggage carrier in accordance with the particular geometry, without resulting in tilting of the baggage carrier frame being necessary.

This adjustability along the baggage carrier frame can be simply obtained. In one form, a sleeve is used, formed of two shells, whose separation plane includes the axes of the opening for the support legs and includes the opening through which a corresponding longitudinal strut of the baggage carrier frame passes. Since the pack support frame should have a horizontal orientation, there is no necessity to provide a swivel connection between the corresponding support legs and the pack support frame. The angle defined by the support leg with the frame remains essentially the same in all adjustments The sleeve has the advantage of permitting use of simple baggage carriers designed for small loads and having a frame consisting of a simple round wire and supported on each side only by a single support leg, also for heavier loads With the aid of the sleeve, an additional support leg on each side can be secured to the round wire of the baggage carrier frame. Additional legs can be retrofitted-on by the user, or installed as original equipment. The manufacturer has the advantage of needing only to stock one kind of baggage carrier for a variety of different uses, loads, or applications, or sizes and types of bicycles.

Another possible way to attain such adjustability is to provide grooves on the baggage carrier frame in the regions within which the support legs must be secured. The fastening means include sliders within these grooves on the carrier frame.

DETAILED DESCRIPTION

Figure 1:
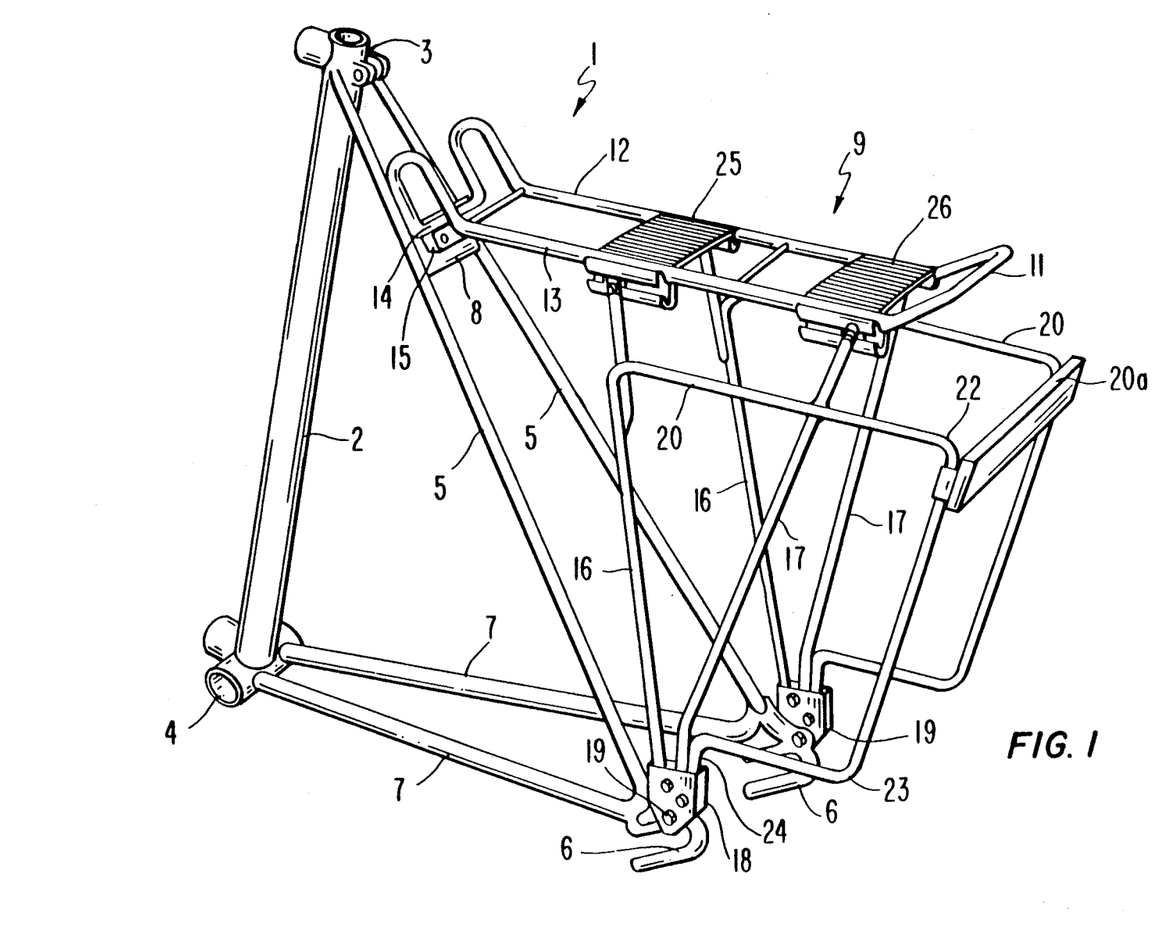
FIG. 1 is a perspective view of the afterstructure of a bicycle with the baggage carrier of the present invention secured thereon.

FIG. 1 illustrates the rear frame, or, afterstructure of a bicycle with its saddle tube 2, which has a saddle-receiving head 3 and a crank-support housing 4. Two rear fork struts 5 run diagonally downward from the saddle-receiving head 3. At their respective free ends, they are connected with the crank-support housing 4 by two substantially horizontally running rear fork tubes 7. The rear fork structure terminates in axle-receiving slots 6.

A cross plate 8, also known in the bicycle field as a Pletscher plate is welded onto rear fork struts 5, bridging them underneath saddle head 3.

A luggage carrier 9 having a substantially rectangular frame 11 which defines a baggage or pack-support surface is secured to the thus-defined bicycle rearstructure 1. Substantially rectangular frame 11 comprises an endless, welded-together round rod or wire having two longitudinal framing or strut portions 12 and 13, which represent the longitudinal sides of frame 11, and a transverse strut 14 at the forward end of frame 11. Strut 14 is secured to plate 8 by a screw fastener. Longitudinal struts 12, 13 run parallel to but spaced from each other, and parallel to the longitudinal extent of the cycle whose afterstructure is shown.

Further support for frame 11 is provided by two pairs of support legs 16 and 17, which are fastened, spaced from each other, to the longitudinal struts 12, 13. Legs 16, 17 converge downwardly in the direction of the corresponding axle-receiving end slot 6. A pair of legs 16, 17 is provided on each side of frame 11. The lower ends of each pair of support legs are angled to run parallel to each other. The ends are slightly spaced from each other and fit into reception holes of a clamping element 18, which is fastened by a screw 19 to the respective axle-receiving end slot 6.

Immediately below frame 11, the support legs 16, 17 of each pair are connected by a brace 20 which is welded to them. This brace 20 extends rearwardly beyond the rear support leg 17 and is bent downwardly at a corner 22. The downwardly extending portion runs about parallel to support leg 17 and bends forward to form another corner 23 and run to just above clamping element 18, where it again bends, downward, to form an end portion 24 which runs parallel to and slightly spaced from the lower ends of support legs 16, 17. The offset or bent-over end portion 24 can be received in a reception hole of clamping element 18, where it can be clamped and held along with support legs 16 and 17. The frame may also include cross-support elements 25, 26.

In accordance with the invention, and in order to assure that, in the normal orientation of the bicycle, standing on a horizontal surface, both the pack support surface, defined by frame 11, and brace 20 run horizontally, independent of how, within certain limits, the afterstructure 1 is dimensioned, support legs 16 and 17 can be secured on both longitudinal struts 12 and 13 at various positions along said struts 12, 13. As a result, it is not critical what spacing the opening for securing screw 15 has from a vertical line passing through attachment plate 8. Spacing changes can be compensated for by correspondingly displacing the fastening of support legs 16, 17 on longitudinal struts 12, 13. Independently of such spacing changes, the horizontal orientation of frame 11, and thus of the pack support surface, can be adjusted and maintained.

Figure 2:
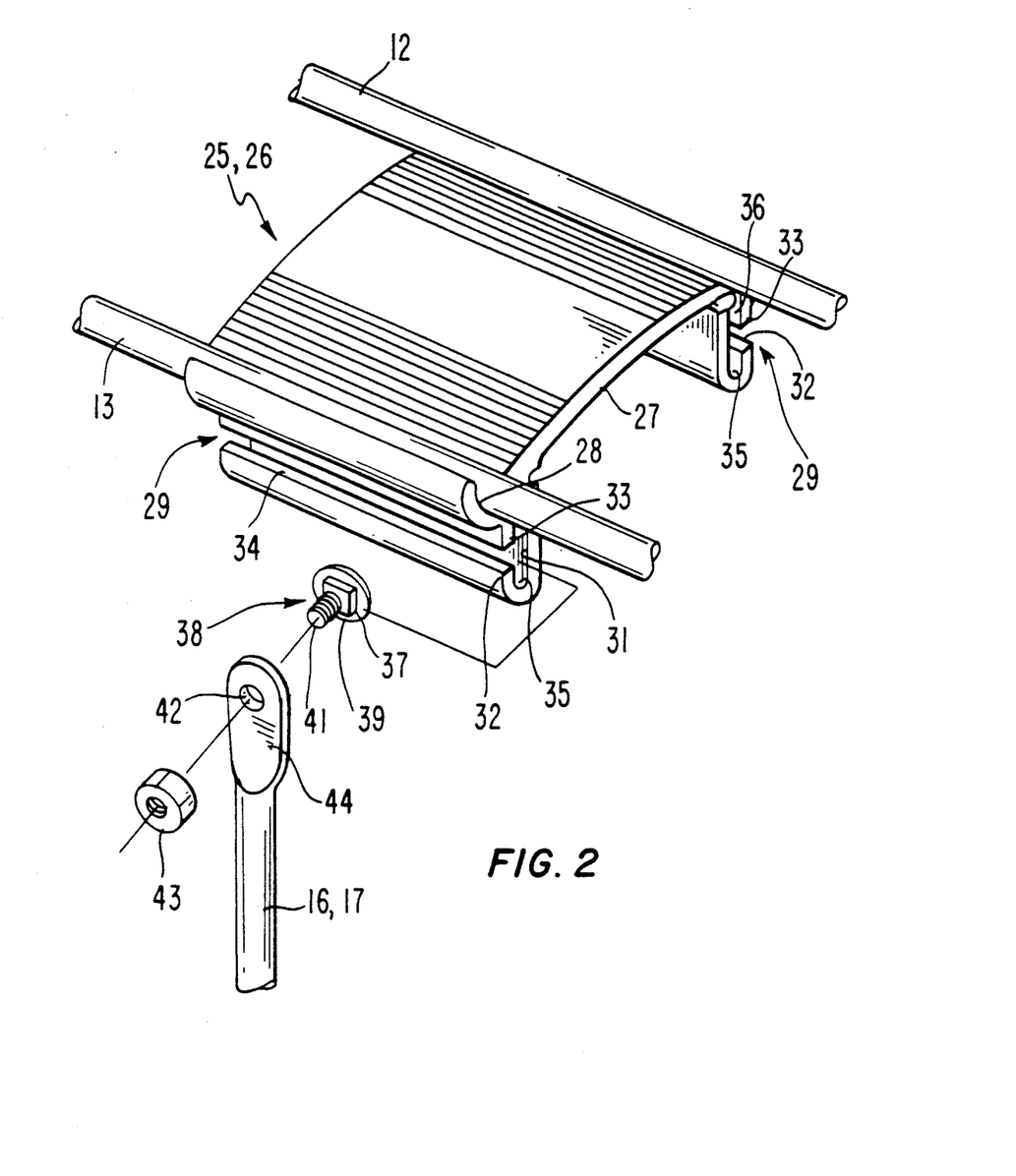
FIG. 2 is an enlarged perspective view of the mounting of one of the support legs on the frame of the baggage carrier of FIG. 1.

The manner of attaching, or fastening the support legs of the embodiment of FIG. 1 is shown enlarged in FIG. 2. As may be seen from FIG. 1, there are provided, in the segments within which support legs 16, 17 of each side are longitudinally adjustable, two extruded cross elements 25, 26. These elements are like each other, so only element 25 to which leg 16 is attached need be described. Essentially the same goes for element 26 and the fastening of support leg 17.

Extruded cross support element 25 has an essentially rectangular, plate-like middle region 27, which on its short sides is formed with part cylindrical grooves 28. These grooves run parallel to each other and have a spacing which corresponds to the spacing of longitudinal struts 12, 13. The longitudinal struts rest in these grooves 28 with the minimum possible play. The attachment of extruded element 25 is by welding, e.g. spot welding preferably where the longitudinal struts 12, 13 come out of their respective grooves 28.

Below each of these two grooves 28, of which FIG. 2 shows only the one facing the observer, there is provided a respective T-groove 29 which runs parallel to the adjacent longitudinal strut 12 or 13. These two T-groves 29 are identical and mirror-symmetrical which is why they are designated with the same reference numeral. The description therefore applies to both T-grooves 29.

Each of T-grooves 29 has a groove base 31 and two groove flanks 32 and 33, bounded at their ends remote from groove base 31 by a groove slit 34. This slit 34 has a slightly larger opening width than do the undercut regions 35 and 36 defined by the two groove flanks 32 and 33. These regions extend with a constant profile or cross-section over the entire length of groove 29 or of extruded element 25. Undercut regions 35 and 36 have a configuration matched to the rounded head 37 of a lockscrew 38, while the width of slit 34 corresponds to the size of a four-cornered extension 39 of lockscrew 38. In this fashion, round head 37 can travel freely in groove 29 from one end to the other end, while the four-cornered extension 39 in its slit 34 prevents rotation of lockscrew 38 about its longitudinal axis.

Lockscrew 38, with its head 37 riding in groove 29, has a threaded shaft 41 which extends outward through slit 34 and goes through a transverse hole 42 formed on the upper end of support leg 16. A nut 43 is screwed onto the end of threaded shaft 41, which protrudes from transverse hole 42. Upon tightening, the nut secures the respective support leg 16 against the outer edge regions of slit 34, while simultaneously the rounded head rests against the corrsponding surfaces of the undercuts 35 and 36. These undercuts have, as is usual with T-grooves, surfaces which run parallel to slit 34 and in a common plane, in order to prevent tightening of nut 43 from giving rise to spreading forces on groove 29. The slits 34 of groove 29 face away from the vehicle.

ATTACHMENT OF LUGGAGE CARRIER TO A BICYCLE FRAME

The luggage carrier 9, which includes the frame and the crosspieces 25, 26, is attached to the frame of the bicycle by first attaching the clamping elements 18 to the bicycle frame at the ends 6, without, however, tightening already the attachment screws 19. The support struts 16, 17 can be shifted vertically in the clamping elements 18, so that the carrier 9 can be readily pivoted about the attachment screws 19 until the forward cross element 14 of the carrier fits against the attachment element 15 of the cross plate 8 of the bicycle. The two pairs of support legs 16, 17 can be shifted along the longitudinal portions 12, 13, in longitudinal direction of the bicycle, so that the horizontal alignment of the luggage support surface can be adjusted. When the desired adjusted position is reached, the attachment screws 19 are tightened, and the nuts 43 likewise are tightened. This provides for stable, unchangeable connection between the support legs 16, 17 to the frame 11 of the luggage carrier 9.

In dependence on preadjustment of the position of clamping element 18 with respect to the support legs 16 and 17, coarse height adjustment can be carried out by loosening the clamping by clamping screws 19 in the clamping part 18 before the angular adjustment of the luggage support surface is determined. The referenced U.S. Pat. No. 4,537,338 describes a suitable structure for the clamp 18.

The upper ends of the support legs 16, 17 are flattened, as seen at 44 (FIG. 2) to provide for as large an area or surface engagement of the support legs 16, 17 on the edge portions adjacent the slits 34. The flattened portions also provide flat engagement surfaces for the nut 43 as well.

Figure 3:
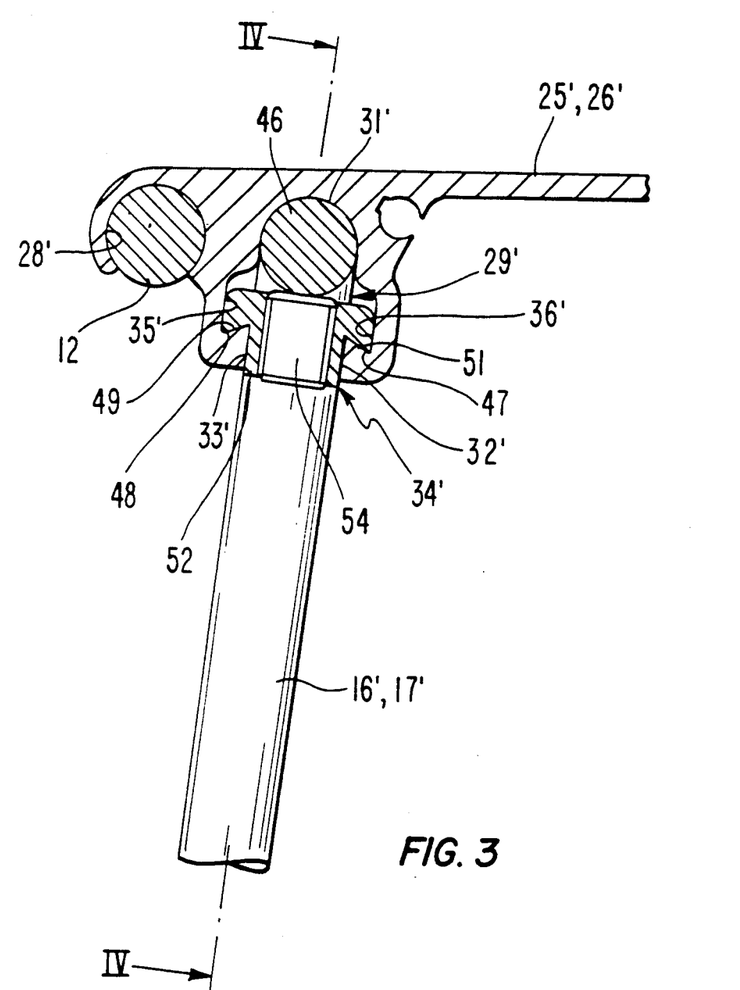
FIG. 3 is an alternate embodiment of a mounting of the upper end of the support legs to the frame of the baggage carrier in a slot transverse to the bicycle's longitudinal axis.
Figure 4:
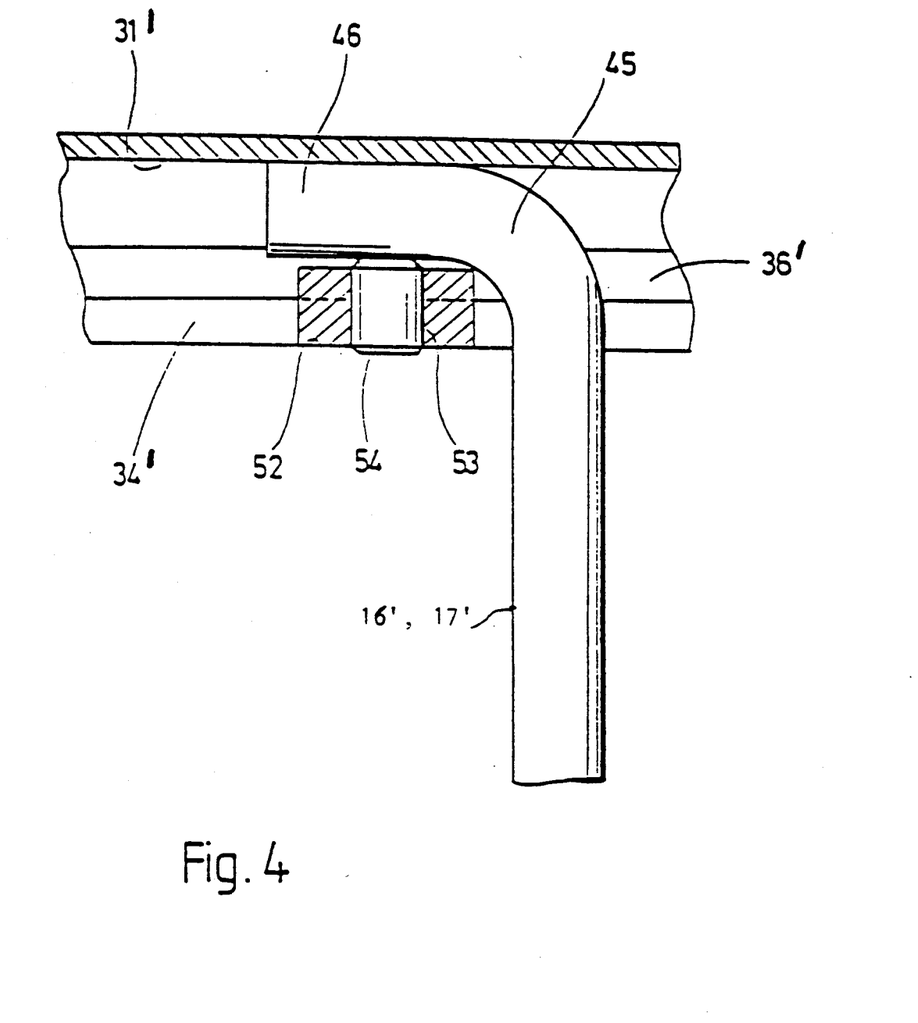
FIG. 4 is a cross-sectional view of the mounting arrangement of FIG. 3, taken along line IV—IV of FIG. 3.

In some constructions it is undesirable to provide for deformation and thus weakening of the support legs 16 and 17. FIGS. 3 and 4 illustrate an arrangement in which the legs 16', 17' are attached without requiring such deformation.

Transverse stiffness is obtained, and enhanced, by the crossbrace 20a, secured to the brace elements 20 just beneath the bend 22.

FIGS. 3 and 4 illustrate only a portion of the cross elements 25', 26', which are open at the bottom, and formed with partly cylindrical grooves 28' which receive, as best seen in FIG. 3, the longitudinal struts 12, 13, respectively. The diameter of the grooves 28' is only slightly greater than the diameter of the longitudinal struts 12, 13, just enough to permit the longitudinal struts 12, 13 to be easily slipped or pushed therein, while still providing for essentially complete engagement over the entire engagement surface between the struts 12, 13 and the groove 28'. Axial attachment of the cross elements 25' and 26' on the longitudinal struts 12, 13 again is carried out by welding, for example by spot-welding at the ends of the groove 28' or at the edges of the grooves.

A groove 29 is located adjacent the respective grooves 28' inwardly, that is, towards the central plane of the bicycle. The groove 29' extends parallel to the respective longitudinal struts 12, 13 and, hence, to the respective groove 28'. Similar reference numerals have been used to those previously employed, and where the parts differ, with prime notations.

The groove 29' ends in a downwardly open slit 34' extends downwardly, in the direction of the respective legs 16' or 17'. The slit 34' is of such width that it corresponds to the diameter of the respective legs 16', 17' which are customarily made of round wire or rod stock. The base 31' of the groove 29' is semi-cylindrical, or partly cylindrical; its circumferential shape is matched to the shape of the support legs 16', 17' which, as shown in FIG. 4, are bent over at their upper ends 45 in approximately L shape, to form an engagement and support portion 46 extending in the direction of the groove 29', that is, parallel to the longitudinal struts 12, 13. The engagement and support portion 46 is thus bent-off with respect to the leg portions of the support legs 16', 17'. The angle. is independent of whether the specific leg is in the position of legs 16 or 17, and is independent of the respective adjustment position. It is always the same, since even due to tolerances in spacing between the attachment plate or Pletscher plate 8 and the position of clamping screw 19, the longitudinal legs 16, 17 can always be adjusted to compensate for any deviations.

The edges 32', 33' of the slit 34' at the end of the groove 29' are undercut at the side remote from the base of the groove 31'; as best seen in FIG. 3, they have plane inclined surfaces 47 and 48, extending throughout the length of the respective groove 29', and in which the edges close to the slit 34' are closer to the root or base of the groove 31' than the edges remote from the slit 34'. These inclined surfaces, together with complementary inclined surfaces 49, 51 of an elongated T-groove slider 52, which is seated in the T-groove 29', form a cooperating interlocking arrangement. The slider 52 fills a suitable portion of the slit 34' by its own longitudinal extent. Approximately midway of the length of the slider, the slider 52 is formed with a tapped bore 53 which extends at right angles to the groove 29', and in which a set screw 54 is inserted to act as a clamping or set screw.

FIGS. 3 and 4 illustrate, in fragmentary form, the carrier in assembled position. The engagement or support portions 46 of the respective support legs 16', 17' are engaged against the root 31' of the groove 29. The slider 52 has been inserted into the T-groove 29'. By turning the clamping or set screw 54, the engagement portion 46 is clamped against the base 31' of the groove; simultaneously, the slider 52 with its inclined engagement surfaces is pressed against the cooperating engagement surfaces 47 and 48 of the T-groove 29'. The entire arrangement, thus, is frictionally clamped in longitudinal direction of the groove. Compressive forces, however, acting vertically on the luggage support surface are transferred directly by interengagement of the base 31 of the groove 29' on the support legs 16', 17' via the bent-over portions 46.

The engagement surfaces 47, 48 and 49, 51, as best seen in FIG. 3, are inclined. Thus, upon tightening of the set screw 54, the edges of the slit 34' are pulled towards each other. There is, thus, no danger that the slider 52 is squeezed outwardly from the T-groove 29'.

Some luggage carriers are constructed very simply and are to be of particularly light weight. In such luggage carriers, the longitudinal struts 12, 13 may be interconnected transversely of the bicycle frame by cross elements which are attached by injection-molded plastic sleeves. In such arrangements, the support legs 16, 17 can be attached to the struts 12, 13 by separate connecting sleeves, shown in FIGS. 5 and 6.

Figure 5:
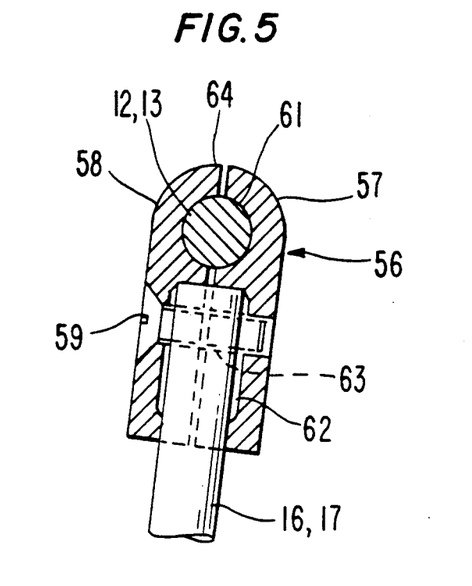
FIG. 5 is a cross-sectional view transverse to the bicycle's longitudinal axis, showing a sleeve coupling used in the present invention.

In accordance with a feature of the invention, a longitudinally split sleeve 56—see FIG. 5—is used. The sleeve 56 is formed of two half-shells 57, 58 which are clamped together by a through-clamping bolt 59. The sleeve 56 is formed with a continuous longitudinal bore or opening 61 to receive the longitudinal strut 12, 13, respectively; further, it includes a blind bore 62, extending at an angle with respect to the opening 61. The cross section of the blind bore is matched to the cross section of the upper end of the respective support leg 16 or 17, respectively. The angle with which the blind bore 62 forms with the longitudinal bore 61 corresponds to the angle under which the respective support leg 16 or 17 extends to the longitudinal strut 12, 13. The bore for the clamping screw 58 preferably extends at a right angle with respect to the axis of the blind bore 62 and through the axis of the blind bore. The upper end of the respective support leg 16, 17 preferably is formed with a suitable crossbore 63 to be capable of receiving the clamping screw 59.

Reliable clamping and simple attachment can be easily obtained by so constructing the two half-shells 57, 58 that the separating surface 64, at which the half-shells engage against each other, is in line with the axis of the throughbore 61 as well as with the blind bore 62. Consequently, each one of the half-shells 57, 58 are formed, essentially, as half-cylindrical elements to receive the bores 61, 62 if the struts as well as the support legs are of round stock and thus have circular cross section.

Figure 6:
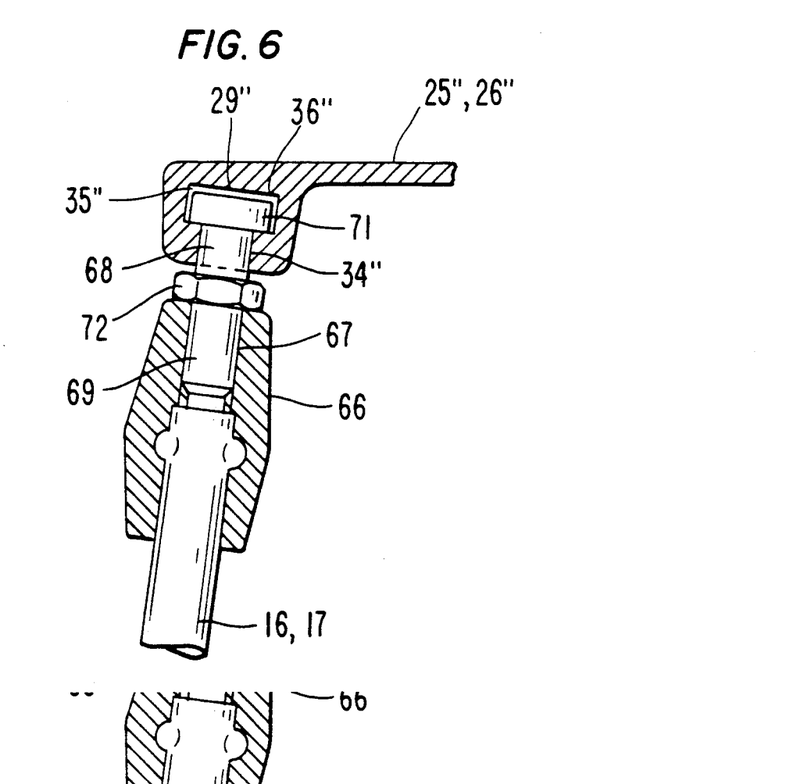
FIG. 6 is a cross-sectional view in a plane transverse to the bicycle's longitudinal axis, showing the fastening of the support strut to the frame of the baggage carrier of the present invention by means of a headed bolt or screw.

The upper ends of the respective support leg 16, 17 also can be formed with a threaded sleeve 66, attached thereto, for example, by injection molding, and which may be of metal or of plastic. The threaded sleeve 66 extends in prolongation of the respective support leg 16 or 17 and includes an upper threaded bore 67. A headed bolt 68 is screwed into the threads of the bore 67, so that its threaded shaft 69 is tightly received therein, and clamped in position by a suitable screw holding arrangement. The headed screw 68 has an essentially flat cylindrical head 71, which, similar to the flat head 37 of the clamping screw 38 (FIG. 2), functions as an adjustable slider, which is seated in a longitudinal groove 29" formed in the respective cross elements 25", 26". The shaft 69 of the headed screw 68 extends downwardly in the direction of the axle attachment portion 6 of the bicycle through the open slit 34" of the T-groove 29". The head 71 in the T-groove 29" is tightened by nut 72, seated between the upper end of the sleeve 66 and the edges of the slit 34". By tightening the nut 72 against the edges of the slit 34", the cylindrical head 71 is pulled against the overlapping surfaces in alignment with the undercuts 35", 36" in the T-groove 29".

Using as a slider the head of a lock screw with a threaded shaft extending out of the respective grooves is an extremely simple, inexpensive and readily adjusted solution to providing a flat support surface for the carrier. The respective leg 16, 17 then, as shown in FIG. 2, can be attached to the very same screw, it only being necessary to provide a screw hole 42 to receive the screw, and attach a nut thereto. By tightening the nut, the respective end portions of the groove are clamped in position by the head of the screw, and likewise by the support leg itself. The screw can readily be prevented from turning upon tightening of the nut by forming it with a square projection, similar to a carriage bolt.

The embodiment illustrated in connection with FIGS. 3 and 4 permits use of a groove which is open to the bottom. This has some advantages since dirt will not collect in the groove and, further, the entire attachment of the support legs will not be visible, since it is placed beneath the luggage carrier. This provides for a pleasing appearance. There are no projecting edges or corners on which parts of carried luggage or clothing can catch. The clamp of the L-bent over ends 46 of the support legs is easily obtained by a clamping screw or set screw, carried through a slider. Upon clamping, a self-locking arrangement is obtained since, by use of a dovetailed slider-groove connection, in which the engagement surfaces between the slider and the groove are inclined towards the base or root of the groove, the edges of the groove adjacent the slit will be pulled toward each other. The slider is complementary in shape to the groove, so that force components will be obtained which have the tendency to tighten the flanks of the grooves towards each other.

The connection is particularly strong and sturdy since the groove, in the region of its root or base, can be readily matched to the shape or profile of the bent-over portion 46 of the support rod, to ensure a large surface engagement between the support rod and the longitudinal region of the cross element.

The groove can also be hidden from view by using the arrangement illustrated in FIG. 6, in which the head of a headed screw forms the slider. The headed screw or bolt is seated in a bore which extends in longitudinal direction of the support leg 16, 17. A nut, tightened towards the head, secures the head and hence the bolt or screw in respective longitudinal position, the head sliding in a T-groove. If this solution is used, the axis of the tapped bore in an attachment sleeve 66, attached to the support leg must be arranged at a right angle to the longitudinal extent of the groove in which the headed screw can slide.

The lower ends of the support legs 16, 17, preferably, are height-adjustable by clamping them in the respective clamping shells 18 by suitable clamping screws 19.

The support legs 16, 17 alwayws will have the same angle with respect to each other and with respect to a vertical line passing through the axis of the wheel, or the attachment point adjacent the region 6 of the frame, independently of the geometry of the frame itself. Thus, the arrangement is particularly suitable to support lateral luggage bags, such as panniers. Each side of the support legs is preferably connected with a cross bar or cross element 22a (FIG. 1) which can also form an additional attachment element for pannier or for saddle bags. The cross element 20a can be extended beyond the support legs, as best seen in FIG. 1, and be bent over at the lower portion by bends 23 before being clamped in the clamping element 18. This arrangement further enhances the stability and strength as well as the weight-carrying capacity of the luggage carrier, while retaining a horizontal position of the support surface of the luggage carrier regardless of bicycle frame geometry.

Various changes and modifications may be made, and any features described herein may be used with any of the others within the scope of the inventive concept.

What is claimed is:

1. Bicycle baggage or luggage carrier (9) adapted for attachment to a portion (8) of a frame of a bicycle said carrier having an elongated carrier frame (11, 25, 26) defining a baggage support surface, said carrier frame including longitudinal side portions (12, 13, 28) extending approximately parallel to a longitudinal axis of said bicycle;

attachment means (14, 15) for attaching one end portion of said carrier frame (9) to said bicycle frame;

at least two support legs (16, 17) extending downwardly from each of said said elements (12, 13) and converging to define a V-configuration, said support legs, each having upper ends and terminating in a free lower end, said free lower ends being adapted to be secured to said bicycle frame adjacent an axle receiving portion (6) thereof; and means for securely attaching said upper ends of the support legs (16, 17) to the carrier frame (9) with said support surface in essentially horizontally aligned position, independently of the geometrical configuration of the bicycle frame and spaced from said attachment means, comprising at least one groove (29, 29') formed in each of said side portions (12, 13, 28) extending longitudinally at least over a predetermined adjustment length of the respective side portion, and parallel to the longitudinal extent of said side portions, wherein said at least one groove (29, 29') terminate in an open slit (34, 34', 34") having a cross-sectional dimension less than the width of said groove to define groove edges projecting toward each other, whereby said at least one groove will be an undercut groove; and releasable clamping means (37, 38, 41, 43; 52, 54; 68, 71, 72) including slidable means (38, 39; 52, 68, 71) formed with an enlarged head located in said undercut groove and engaged by said projecting groove edges, said enlarged head and said undercut groove forming interengaging projection and recess means; and means (41, 43; 54; 66, 69) for coupling said slidable clamping means to said upper ends of the support legs and hence at any selected longitudinal position to said longitudinal side portions of said carrier frame, for selectively and securely connecting said upper ends of said support legs at any selected position within said adjustment lengths of said at least one undercut groove.

2. The carrier of claim 1, wherein said releasable clamping means further includes screw means for clamping said slidable means in longitudinally adjusted position.

3. The carrier of claim 11, wherein said slidable means comprises a screw or bolt element (38) having said enlarged head and including a shaft portion (41) projecting through said slit (34);

the upper ends of the support legs (16, 17) are formed with an opening (42) in the region of the terminal end thereof to receive said shaft portion (41);

and said coupling means comprises a holding nut means (43) screwed on said shaft portion (41) for securing the legs to said slidable means and for clamping, said slidable means in longitudinally adjusted position in said at least one groove.

4. The carrier of claim 2, wherein said releasable clamping means (71) includes a unitary threaded shaft (69);

means (66) are provided at an end portion of the respective legs (16, 17) defining a tapped bore (67); and a clamping nut (72) is threaded on said threaded shaft (69), and the clamping means further includes a clamping nut for tightening against the outside of said groove edges (32", 33").

5. The carrier of claim 4, wherein said means (66) for forming said threaded opening (69) comprises a sleeve element (66) rigidly secured to an upper end portion of the respective support leg (16, 17).

6. The carrier of claim 1, wherein the support legs (16, 17), at least adjacent their upper ends, have circular cross section.

7. The carrier of claim 1, further including a clamping holder (18) receiving said free ends of said support legs, and height-adjustably retaining said free ends therein, said clamping holder being attachable to said vehicle adjacent the axle receiving portion (6).

8. The carrier of claim 1, wherein said carrier frame further includes at least one cross element (25, 26) having a longitudinal extent which is at least as long as said predetermined adjustment length forming part of said baggage support surface, and wherein said at least one cross element is formed with at least one longitudinally extending groove;

and wherein said releasable clamping means comprise slider means slidable in said at least one groove (29, 29').

9. The carrier of claim 1, wherein said at least one groove (29, 29') and said open slit (34, 34', 34"), face downwardly with respect to said horizontal position of the support surface.

10. Bicycle baggage or luggage carrier (9) adapted for attachment to a portion (8) of a frame of a bicycle, said carrier (9) having an elongated carrier frame (11, 25, 26) defining a baggage support surface, said carrier frame including longitudinal side portions (12, 13, 28) extending approximately parallel to a longitudinal axis of said bicycle;

attachment means (14, 15) for attaching one end portion of said carrier frame (9) to said bicycle frame;

at least two support legs (16, 17) extending downwardly from each of said side elements (12, 13) and converging to define a V-configuration, said support legs, each, having upper ends and terminating in a free lower end, said free lower ends being adapted to be secured to said bicycle frame adjacent an axle receiving portion (6) thereof; and means for securely attaching said upper ends of the support legs (16, 17) to the carrier frame (9) with said support surface in essentially horizontally aligned position, independently of the geometrical configuration of the bicycle frame and spaced from said attachment means, comprising at least one groove (29, 29') formed in each of said side portions (12, 13, 28) extending longitudinally at least over a predetermined adjustment length of the respective side portion, and parallel to the longitudinal extent of said side portions, wherein said at least one groove (29, 29') terminates in an open slit (34, 34', 34") having a cross-sectional dimension less than the width of said groove to define groove edges projecting toward each other, whereby said at least one groove will be an undercut groove; and releasable clamping means including slidable means formed with an enlarged head located in said undercut groove and engaged by said projecting groove edges, said enlarged head and said undercut groove forming interengaging projection and recess means; and means (41, 43; 54; 60, 69) for coupling said slidable clamping means to said upper ends of the support legs and hence at any selected longitudinal position to said longitudinal side portions of said carrier frame, for selectively and securely connecting said upper ends of said support legs at any selected positon within said adjustment lengths of said at least one undercut groove, wherein the upper ends of the support legs (16, 17) are angled off to form an angled end portion (46);

said at least one groove (29') is dimensioned and shaped to receive said angled-off portion and engage the angled-off portion with a root or base surface (31') in the groove; and said releasable clamping means comprises means (52) located in said groove (29, 29') and inwardly of said overlapping projecting edges for clamping said angled-off portion at longitudinally selectively adjusted position in said groove.

11. The carrier of claim 10, wherein said means located in said groove comprises a slide block (52) formed with a tapped bore (53); and said coupling means comprises a set screw (54) in the slide block for tightening the angled-off portion (46) of the support legs against a root or base surface (31') of the groove (29') and clamping said slide block against said overlapping groove edges (32', 33').

12. The carrier of claim 11, wherein said overlapping groove edges are formed as dove-tailed edges having clamping surfaces (37, 48) extending longitudinally of the groove (29') and projecting in the direction of the base or root (31') of the groove (29') in a region close to the center of the groove (29) to form said dove-tailed edges; and wherein said slide block (52) has complementary surfaces (49, 51) cooperating with said clamping surfaces (47, 48) to tighten together said groove edges (32', 33') upon clamping of said slide block in said groove.

13. The carrier of claim 12, wherein the base or root (31') of the groove (29') is matched in cross section to the cross-sectional profile of the angled-off end portion (46) of the respective support leg (16', 17').

14. The carrier of claim 10, further including a brace element (20) connecting said legs (16, 17) and positioned intermediate the frame (11) and the free ends of said support elements.

15. The carrier of claim 14, wherein said brace element (20) extends beyond that one (17) of said support legs remote from the frame of the vehicle to form an extending portion, said extending portion being bent over (22) and downwardly in the direction of the axle receiving portion (6) of the bicycle for attachment to said vehicle at said axle receiving portion (6).

16. The carrier of claim 10, wherein the support legs (16, 17), at least adjacent their upper ends, have circular cross section.

17. The carrier of claim 10, further including a brace element (20) connecting said legs (16, 17) and positioned intermediate the frame (11) and the free ends of said support legs.

18. The carrier of claim 10, wherein said at least one groove (29, 29') and said open slit (34, 34', 34'') face downwardly with respect to said horizontal positon of the support surface.

19. The carrier of claim 10, wherein said carrier frame further includes at least one cross element (25, 26) forming part of said baggage support surface;
    wherein said at least one cross element is formed with two of said longitudinally extending grooves, one at either side of said carrier frame; and
    wherein said releasable clamping means comprises slider means slidable in a respective one of said grooves.

20. The carrier of claim 10, wherein said carrier frame further includes at least one cross element (25, 26) spanning across said longitudinal side portions (12, 13, 28) and forming part of said baggage support surface;
    wherein said at least one cross element is formed, at either side, with said longitudinally extending groove; and
    wherein said releasable clamping means comprises slider means, slidable in said grooves (29, 29'), said grooves, and said open slits from said grooves facing downwardly with respect to said horizontal position of the support surface.

* * * * *